United States Patent Office 3,536,587
Patented Oct. 27, 1970

3,536,587
ENZYME RESIN AND A PROCESS FOR THE PREPARATION THEREOF
Mark A. Stahmann, Madison, Wis., and Yasuhisa Ohno, Hino-shi, Tokyo, Japan; said Ohno assignor of fifty percent to Teijin Limited, Umeda, Osaka, Japan, a corporation of Japan
No Drawing. Filed Dec. 12, 1967, Ser. No. 689,761
Claims priority, application Japan, Oct. 14, 1967, 42/65,939
Int. Cl. C07g 7/02
U.S. Cl. 195—63            12 Claims

ABSTRACT OF THE DISCLOSURE

A process for the preparation of an enzyme resin by reacting an enzyme with an acid azide derivative derived from a hydrazide prepared from a copolymer consisting of 9–75 weight percent of a lower aliphatic ester of acrylic acid, 20–90 weight percent of acrylamide and 0.5–10 weight percent of N, N'-mono- or poly-methylene-bis-acrylamide.

---

This invention relates to a novel water-insoluble enzyme resin that is an enzyme-coupled resin having an enzymatic activity, and a process for the preparation thereof. According to this invention a stable water-insoluble enzyme resin having efficient enzymatic activities can be obtained economically.

An enzyme has a catalytic activity for inducing a specific chemical reaction with good efficiency, and methods for synthesizing various useful substances by utilizing enzymes are widely known. Being water-soluble, enzyme cannot actually be used repeatedly, and is lost in every reaction. The enzyme purified to an extent practically usable often loses its activity rapidly, and the resulting reaction product contains impurities derived from the enzyme. Thus, there have been many difficulties and restrictions in the use of enzyme in an industrial process. Attempts to insolublize enzyme with a view to removing such defects have been reported.

Generally, the previously used physical adsorption method had the defect that the desorption of enzyme took place during repeated use, and the hiterto known covalent binding method did not render enzyme completely water-insoluble or only gave enzyme poor in stability. For instance, it is known that chymotrypsin can be bound to an azide derivative of carboxymethyl cellulose [see M. A. Mitz and L. J. Sumaria: Nature, vol. 189, p. 576 (1961)], and it is reported there that it is impossible to completely insolublize an enzyme-cellulose derivative because its solubility is affected by the degree of substitution, uniformity of substitution and form of carboxymethyl cellulose, a starting carrier, and other factors. In a report of the coupling of trypsin to an azide derivative of carboxymethyl cellulose [C. J. Epstein and O. B. Anfinsen: Journal of Biological Chemistry, vol. 237, p. 2175 (1962)], it is said that a decrease in enzymatic activity was observed when the enzyme-cellulose derivative was treated with a urea solution. The authors suggest that trypsin is temporarily adsorbed to cellulose by a bond dissociable in the presence of urea (such as hydrogen bond) or the enzyme-cellulose deriviatve contains a portion soluble in the urea solution. Such soluble enzyme derivative comes into a reaction product as impurity, and therefore cannot be used industrially.

Furthermore, cellulose undergoes decomposition by some bacteria and is solubilized, and moreover it is difficult to adjust the particle size of finely divided powder of cellulose. Hence, the preparation of a water-insoluble enzymen resin by using an azide derivative of carboxymethyl cellulose as an enzyme carrier has encountered various difficulties.

We have made an extensive research in an attempt to overcome such difficulties by using a water-insoluble synthetic polymer having some hydrophilicity as an enzyme carrier, and have found that:

(1) an azide derivative of a cross-linked copolymer of acrylamide with a lower aliphatic ester of acrylic acid (to be abbreviated as acrylic copolymer) can be formed;
(2) the water-insoluble azide derivative can be reacted with an enzyme in a buffer having a pH that does not affect the enzymatic activity significantly;
(3) the so obtained anzyme resin is completely insoluble in water, and the size of its particles can be optionally changed by forming the starting polymer by emulsion-polymerization;
(4) this enzyme resin has an enzymatic acitvity based on the amount of the bound enzyme higher that that of the enzyme-cellulose derivative; and,
(5) this enzyme resin retains enzymatic acitvity after storage for a long period of time.

Based on these findings, we have arrived at this invention.

We provide a novel water-insoluble enzyme resin by which an acid azide derivative obtained from a cross-linked copolymer of acrylamide with a lower aliphatic ester of acrylic acid is chemically coupled with an enzyme, and a process for the preparation thereof.

The cross-linked copolymer of acrylamide twith a lower aliphatic ester of acrylic acid used as carrier in this invention is an acrylic copolymer composed of (i) 9–75%, preferably 20–60% by weight of a lower aliphatic ester of acrylic acid;
(ii) 20–90%, preferably 30–80% by weight, of acrylamide; and
(iii) 0.5–10%, preferably 1–5% by weight of N,N'-mono- or polymethylene-bis-acrylamide, a total amount of these components being 100% by weight.

The lower aliphatic ester of acrylic acid, used herein, is an alkylester of acrylic acid, the said alkyl group having 1–4 carbon atoms, methyl or ethyl ester of acrylic acid being especially convenient to use.

The N,N'-mono- or poly-methylene-bis-acrylamide is a compound expressed by the following formula

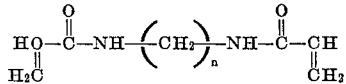

wherein $n$ is 1–30, or may be more preferably 1–6 (this compound will be called merely bis-acrylamide hereinafter).

When bis-acrylamide is used in an amount less than 0.5% by weight, the cross-linking is insufficient and part of the resulting enzyme resin becomes water-soluble. It may be used in an amount more than 10% by weight, but in this amount, it is difficult to control the particle size of the enzyme resin, therefore, the preferred amount of bis-acrylamide is 1–5% by weight.

When the three components mentioned above are copolymerized, copolymers consisting of the aforementioned amounts of acrylic acid units represented by the formula

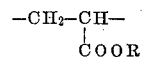

acrylamide units represented by the formula

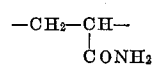

and methylene-bis-acrylamide units represented by the formula

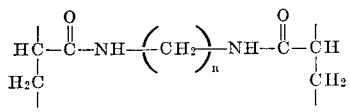

are obtained.

In order to chemically combine any one of these copolymers with an enzyme, the acrylic acid units must be activated. As means for activation, we prefer to convert the acrylic acid units to azide by reacting said copolymer with hydrazine and thereafter with nitrous acid.

However, in accordance with our invention, the enzyme resin can be also prepared by other processes as follows.

Instead of using the lower aliphatic esters of acrylic acid, the same amount of acrylic acid is used and after polymerizing the acrylic acid with the other two components mentioned above to obtain the copolymer and thereafter the copolymer is activated by converting the acrylic acid units to an acrylic acid halide or an acrylic acid anhydride and then reacting the activated copolymer with an enzyme.

Thus the enzyme resins obtained by the processes mentioned above in accordance with this invention comprise an enzyme and a carrier copolymer consisting of 9–75% by weight of acrylic acid units, 20–90% by weight of acrylamide units and 0.5–10% by weight of N,N-mono- or poly-methylene-bis-acrylamide units, the total amount of these copolymer components being 100% by weight, and said enzyme and said carrier copolymer being chemically bonded through carboamide groups represented by the following formula

wherein

represents a residual group derived from said enzyme and

represents a carbonyl group derived from said copolymer.

Because the enzyme resin produced according to the method of this invention is completely water-insoluble, it can be easily recovered by filtration or centrifugation after having been used in an enzymatic reaction, and reused. Furthermore, this enzyme resin is produced in spherical form which is suitable for packing into a column, and so the enzymatic reaction can be continuously carried out by the use of such enzyme resin. If an enzyme resin column is used, a reaction solution flowing from it does not contain impurities derived from the enzyme, and it is not necessary to conduct a complicated post-treatment for removal of enzyme which is necessitated when the enzyme alone is used.

According to the process of this invention, acrylamide has an effect of stabilizing enzyme, and a copolymer derivative comprising more than 20% by weight of acrylamide is especially effective, as shown in Table 1 below.

TABLE 1.—ACRYLAMIDE CONTENT IN AN ACRYLIC COPOLYMER AND THE ENZYMATIC ACTIVITY OF AN ACRYLASE RESIN OBTAINED FROM IT

| Run No. | Acrylamide content (percent by weight) | Ratio of activity of the acrylase resin with respect to the bound acylase and that of the starting acylase |
|---|---|---|
| 1 | 0 | 0.6 |
| 2 | 10 | 0.6 |
| 3 | 20 | 0.8 |
| 4 | 48 | 1.0 |

NOTE.—Substrate is N-acetyl-DL-alanine.

In the above Runs Nos. 1–4, the measured values are with respect to enzyme resins produced according to the conditions specified in Example 2 below. As for Run No. 4, the enzyme resin is one obtained in Example 2.

If the content of acrylamide units exceeds 90% by weight, the proportion of the lower aliphatic ester of acrylic acid in a copolymer is decreased and naturally the amount of the coupled enzyme is disadvantageously reduced.

The azide derivative may be one formed by any reaction which converts ester to azide in a polymer of a lower aliphatic ester of acrylic acid. Such reaction, for instance, comprehends a reaction by nitrous acid subsequent to a conversion of the ester to hydrazide by reaction with hydrazine as shown by the following formula which, for the sake of convenience, indicates only an acrylic ester portion of the acrylic copolymer.

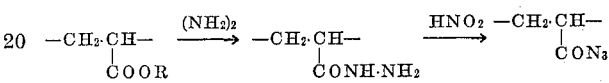

The formation of the azide is done to activate the carboxyl group so that it will react with and be coupled to the enzyme. Other ways to activate the carboxyl group in acrylic copolymers could be used; for example, the carboxyl group of acrylic acid residues in copolymers may be converted to an acid chloride or anhydride and then reacted with an enzyme, however, we prefer the azide procedure, because it is easy to prepare and reacts readily with enzymes.

The enzymes used according to this invention include, for instance, hydrolytic enzymes such as trypsin, chymotrypsin, pepsin, pancreatin, papain, fungal and bacterial proteases, amino acid acylase, ribonuclease, phosphatase, pectinase, invertase, and amylase.

The reaction medium may be any medium so long as it does not deactivate the enzyme, and is relatively inert to an azide derivative. As it is preferable to carry out the reaction in a pH range of 7 to 9, a buffer having a pH in this range is suitable. Any known buffer is usable such as alkali phosphates and bicarbonates. As regards the reaction temperature, the range of 0 to 37° C. is preferable.

Under similar conditions, the azide derivative may be reacted with other enzymes and with soluble proteins which are not enzymes to produce insoluble protein resins. In this way, proteins such as $\beta$-lactoglobulin, bovine serum alubumin, $\alpha$-lactalbumin, and bovin-$\gamma$-globulin were coupled to the resin by covalent bonds. Each protein resin thus prepared was specifically agglutinated by rabbit antisera against that protein and not by antisera against other proteins. This ability of the protein resins to specifically react with antibodies to the protein shows that the tertiary structure of the protein was not altered by coupling to the resin.

The polyacrylamide enzyme-resins have remarkable stability and are much more stable to storage and to chemical or physical denaturing agents than the enzyme alone or other enzyme-carrier combinations. Thus, trypsin alone lost all enzymatic activity within one month on storage at 4° C., in contrast our trypsin-resin lost only 26% of its initial activity under the same conditions. The thermal stability of the trypsin derivative was superior to that of the free trypsin. When an acylase-resin was heated for 20 minutes at 100° C. in a solution containing picric acid or acetic acid which are protein denaturing agents, it retains considerable enzymatic activity whereas all the enzymatic activity of the acylase alone was destroyed by the same treatment. These results showed that the hydrophilic acrylamide residues have a stabilizing effect on enzyme that other enzymes carriers lack.

The polyacrylamide resins have the further advantage over natural polymers like cellulose in that they may be prepared in granular form by emulsion polymerization, the particle size and degree of porosity may be controlled and they can be made with various amounts of enzyme coupled to the resin. The enzymatic activity of the enzyme resins are higher than that of enzyme-cellulose or other enzyme carrier products described in the literature. Thus, the activity of amino acid acylase when coupled to the polyacrylamide resin was about the same as that of the native enzyme. The water-insoluble trypsin derivative showed about 40% enzymatic activity of that of the crystalline trypsin and the activity was retained after repeated use.

Now, the invention will be described by example. Parts in the examples shows parts by weight.

EXAMPLE 1

Twelve parts of a hydrazide derivative derived from a copolymer consisting of 4% by weight of N,N'-methylene-bis-acrylamide, 48% by weight of acrylamide and 48% by weight of methyl acrylate was suspended in 600 parts by volume of distilled water, and 60 parts by volume of 36.5% hydrochloric acid and 300 parts by volume of a 4% aqueous solution of sodium nitrite were gradually added. This reaction mixture was stirred at 0° C. for one hour. Then, a water-insoluble azide derivative was quickly separated by filtration, washed several times with an ice-cooled water, and added to 1200 parts by volume of a 0.1 M potassium phosphate buffer (pH 7.0) in which 1.2 parts of trypsin has been dissolved. The mixture was stirred continuously for 24 hours at 4° C. Unreacted trypsin was completely removed by washing five times with 1000 parts by volume of a 0.02 M potassium phosphate buffer (pH 7.0). There was 0.46 part of enzyme protein contained per 100 parts of the resulting enzyme resin. The hydrolytic activity of the enzyme resin measured by continuous titration of a liberated acid from N-α-benzoyl-L-arginine ethyl ester in an aqueous solution is 40% of that of the starting trypsin with respect to the amount of the coupled enzyme. Trypsin, when stored for one month at 4° C. in an aqueous solution having a pH of 5, retained only 6% of the original enzymatic activity, while the enzyme resin of this invention retained 35% of the activity of the starting trypsin under the same conditions.

EXAMPLE 2

Twelve parts of the water-insoluble azide derivative obtained under the same conditions as in Example 1 was reacted with 2.4 parts of acylase in 1200 parts by volume of 0.5 M sodium bicarbonate solution (pH 8.2) to give 12 parts of a water-insoluble enzyme resin. There was 0.76 part of enzyme protein bound to 100 parts of this enzyme resin. When N-acetyl-α-amino acid was used as a substrate, it showed the following enzymatic activity with respect to the amount of bound enzyme.

TABLE 2.—ENZYMATIC ACTIVITY OF WATER-INSOLUBLE ACYLASE RESIN

| Substrate | Ratio of activity of insoluble acylase resin to that of acylase |
|---|---|
| N-acetyl-DL-alanine | 1.00 |
| N-acetyl-DL-methionine | 0.86 |
| N-acetyl-DL-norleucine | 0.79 |

EXAMPLE 3

Twelve parts of an azide derivative formed from a copolymer consisting of 5% by weight of N,N'-methylene-bis-acrylamide, 75% by weight of acrylamide and 20% by weight of methyl acrylate was reacted with 1.2 parts of chymotrypsin in 1200 parts by volume of a 0.5 M sodium bicarbonate solution (pH 8.2) to give 13 parts of a water-insoluble enzyme resin. There was 4.34 parts of enzyme bound to 100 parts of this enzyme resin, and it had an enzymatic activity 50% of that of the bound enzyme.

EXAMPLES 4–7

Twelve parts of the water-insoluble azide derivative obtained under the same conditions of Example 1, except that the amounts of N,N'-methylene-bis-acrylamide acrylamide and methyl acrylate which were in the amounts indicated in Table 3, were reacted with trypsin as described in Example 1.

The enzyme resins were shown to have enzymatic activity by the procedure described in Example 1.

TABLE 3.—COMPOSITION OF INSOLUBLE COPOLYMERS

| Example | Composition of copolymer | | | Enzyme |
| | MA [1] percent | AAM, [2] percent | BIS, [3] percent | |
|---|---|---|---|---|
| 4 | 20 | 70 | 10 | Trypsin. |
| 5 | 10 | 80 | 10 | Do. |
| 6 | 10 | 85 | 5 | Do. |
| 7 | 75 | 20 | 5 | Do. |

[1] MA—methyl acrylate.
[2] AAM—acryl amide.
[3] BIS—N,N'-methylene-bis-acrylamide.

What is claimed is:

1. A process for the preparation of an enzyme resin, which is characterized by reacting an acid azide derivative derived from a hydrazide prepared from a copolymer consisting of 9–75% by weight of a lower aliphatic ester of acrylic acid, 20–90% by weight of acrylamide and 0.5–10% by weight of N,N'-mono- or poly-methylene-bis-acrylamide, the total amount of these copolymer components being 100% by weight, with an enzyme.

2. A process for the preparation of an enzyme resin according to claim 1 wherein said enzyme is a hydrolytic enzyme.

3. A process according to claim 1 wherein amount of said lower aliphatic ester of acrylic acid is 20–60% by weight.

4. A process according to claim 1 wherein amount of said acrylamide is 30–80% by weight.

5. A process according to claim 1 wherein amount of said bis-acrylamide is 1–5% by weight.

6. A process according to claim 1 wherein said lower aliphatic ester of acrylic acid is selected from the group consisting of methyl acrylate and ethyl acrylate.

7. A process according to claim 1 wherein said N,N'-mono- or poly-methylene-bis-acrylamide is selected from the group consisting of compounds represented by the following formula

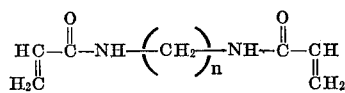

wherein $n$ is an integer of 1–30, preferably 1–6.

8. A novel enzyme resin comprising an enzyme and a carrier copolymer consisting of 9–75% by weight of acrylic acid units, 20–90% by weight of acrylamide units and 0.5–10% by weight of N,N'-mono- or poly-methylene-bis-acrylamide units, the total amount of these copolymer components being 100% by weight, and said enzyme and said carrier copolymer being chemically bonded through carboamide groups represented by the following formula

wherein

represents a residual group derived from said enzyme and

represents a carbonyl group derived from said copolymer.

9. A novel enzyme resin according to claim 8 wherein said enzyme is a hydrolytic enzyme.

10. A novel enzyme resin according to claim 8 wherein amount of said acrylic acid units is 20–60% by weight.

11. A novel enzyme resin according to claim 8 wherein amount of said acrylamide units is 30–80% by weight.

12. A novel enzyme resin according to claim 8 wherein amount of said bis-acrylamide units is 1–5% by weight.

References Cited

Bernfeld et al., Science, vol. 142, November 1963, pp. 678–679.

LIONEL M. SHAPIRO, Primary Examiner

U.S. Cl. X.R.

195—68